(12) United States Patent
Behringer et al.

(10) Patent No.: US 12,155,194 B2
(45) Date of Patent: Nov. 26, 2024

(54) METHOD AND DEVICE FOR CONNECTING A CAPACITIVE LOAD ASSEMBLY TO A DC GRID

(71) Applicant: Siemens Aktiengesellschaft, Munich (DE)

(72) Inventors: Klaus Behringer, Igensdorf (DE); Wolfgang Feil, Schwandorf (DE); Peter Kaluza, Rieden (DE); Matthias Meier, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 213 days.

(21) Appl. No.: 17/611,727

(22) PCT Filed: May 15, 2020

(86) PCT No.: PCT/EP2020/063568
§ 371 (c)(1),
(2) Date: Nov. 16, 2021

(87) PCT Pub. No.: WO2020/234134
PCT Pub. Date: Nov. 26, 2020

(65) Prior Publication Data
US 2022/0239091 A1    Jul. 28, 2022

(30) Foreign Application Priority Data

May 17, 2019  (EP) ..................................... 19175084

(51) Int. Cl.
*H02H 3/087*  (2006.01)
*H02H 3/027*  (2006.01)
(Continued)

(52) U.S. Cl.
CPC ............ *H02H 3/087* (2013.01); *H02H 3/027* (2013.01); *H02H 9/001* (2013.01); *H02J 7/345* (2013.01)

(58) Field of Classification Search
CPC .......... H02H 3/20; H02H 9/025; H02H 3/087; H02H 3/027; H02H 3/08; G06F 1/26; H03K 17/082; H02J 7/345
(Continued)

(56) References Cited

U.S. PATENT DOCUMENTS 6,356,423 B1    3/2002  Hastings et al.
7,672,106 B1 *  3/2010  Sullivan ................. H05B 39/02
                                                    361/93.8
(Continued)

FOREIGN PATENT DOCUMENTS

CN    1320991 A    11/2001
CN    1976156 A    6/2007
(Continued)

OTHER PUBLICATIONS

PCT International Search Report and Written Opinion of International Searching Authority mailed Aug. 5, 2020 corresponding to PCT International Application No. PCT/EP2020/063568 filed May 15, 2020.
(Continued)

*Primary Examiner* — Danny Nguyen
(74) *Attorney, Agent, or Firm* — Harness, Dickey & Pierce, P.L.C.

(57) ABSTRACT

A method is for connecting a capacitive load assembly to a DC grid. The load assembly is connectable to a supply potential of the DC grid by a control unit via a controllable switch element. The controllable switch element is periodically activated and deactivated by the control unit. The level of the current pulses flowing through the controllable switch
(Continued)

element during the respective activation phase of the controllable switch element is detected by means of a current measuring device. The development of the level of at least two current pulses immediately following one another over time is evaluated by the control unit. The controllable switch element is additionally periodically activated and deactivated by the control unit if a specified change in the development of the level of the at least two current pulses immediately following one another over time is ascertained.

19 Claims, 2 Drawing Sheets

(51) Int. Cl.
  *H02H 9/00* (2006.01)
  *H02J 7/34* (2006.01)
(58) Field of Classification Search
  USPC .................................. 361/86–87, 93.7–93.9
  See application file for complete search history.

(56) References Cited

U.S. PATENT DOCUMENTS

| | | | |
|---|---|---|---|
| 9,887,532 B2* | 2/2018 | Djelassi | H02H 3/08 |
| 2007/0103833 A1 | 5/2007 | Harris et al. | |
| 2009/0116161 A1* | 5/2009 | Takahashi | H03K 17/687 |
| | | | 361/100 |
| 2011/0032652 A1 | 2/2011 | Shimada | |
| 2011/0110009 A1* | 5/2011 | Sugimoto | H03K 17/0822 |
| | | | 361/93.1 |
| 2013/0038257 A1* | 2/2013 | Sato | H02P 6/12 |
| | | | 318/434 |
| 2014/0347774 A1* | 11/2014 | Uehara | H02H 3/0935 |
| | | | 361/87 |
| 2017/0069441 A1 | 3/2017 | Mishrikey et al. | |
| 2019/0123549 A1* | 4/2019 | Rodrigues | G06F 1/28 |

FOREIGN PATENT DOCUMENTS

| | | |
|---|---|---|
| CN | 101873755 A | 10/2010 |
| CN | 101971474 A | 2/2011 |
| CN | 102939708 A | 2/2013 |
| JP | 2017153171 A | 8/2017 |
| TW | M455288 U | 6/2013 |
| WO | WO 2015124885 A1 | 8/2015 |

OTHER PUBLICATIONS

German Office Action mailed Oct. 29, 2019.

* cited by examiner

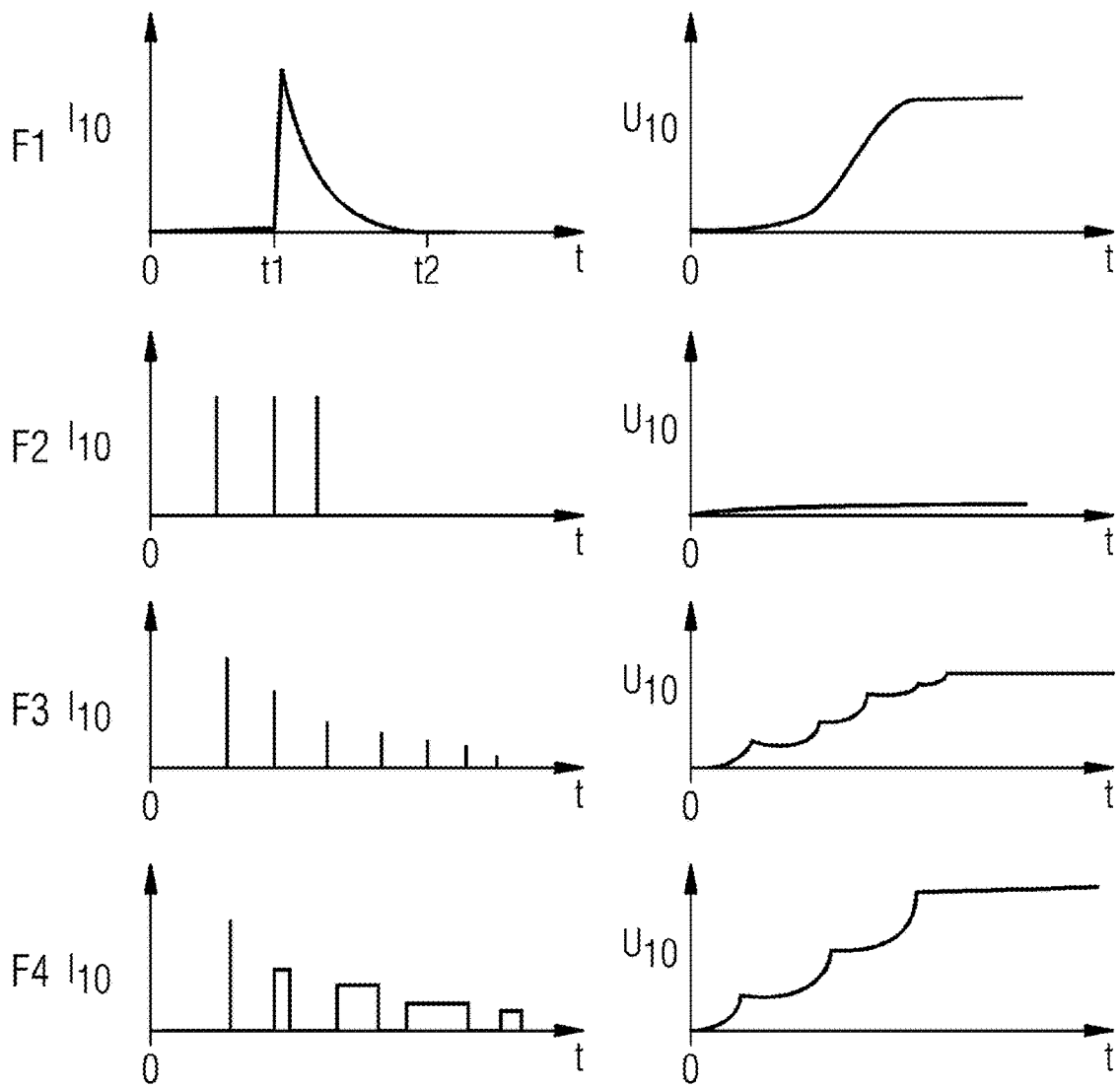
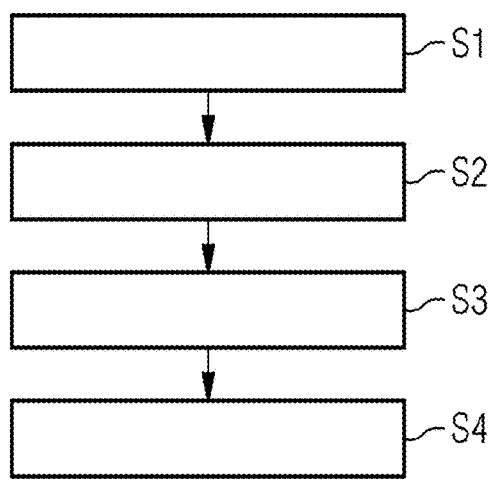

METHOD AND DEVICE FOR CONNECTING A CAPACITIVE LOAD ASSEMBLY TO A DC GRID

PRIORITY STATEMENT

This application is the national phase under 35 U.S.C. 371 of PCT International Application No. PCT/EP2020/063568 which has an International filing date of May 15, 2020, which designated the United States of America 2020 and which claims priority to European patent application No. EP19175084 filed May 17, 2019, the entire contents of each of which are hereby incorporated herein by reference.

FIELD

The present application generally relates to a method and to a device for connecting a capacitive load assembly to a DC grid.

BACKGROUND

Load assemblies that comprise one or more capacitive consumers and that are supplied with power from a DC grid are used in particular in the industrial sphere. The supply of power to load assemblies from DC grids affords the advantage of being able to react to fluctuating grid quality and energy supplies in a flexible and robust manner by way of intelligent grid control and integrated stores. In particular, regenerative energy generators, such as battery stores and/or photovoltaics installations, for example, can easily be integrated into a DC grid. Conversion losses from AC to DC voltage can be prevented in this case. The option of being able to buffer-store braking energy, for example of drives operated by way of a generator, results in energy savings.

The energy in a DC grid is distributed as in the previously used AC grids. While inductive load assemblies usually dominate in AC grids, it is predominantly load assemblies having one or more capacitive consumers that are found in DC grids. This results in very high currents flowing when the capacitive load assembly is connected to the DC grid, which should be prevented as far as possible. Therefore, until now, capacitive load assemblies have been provided via switch-on resistors, which are interconnected in parallel with a controllable switch-on element, in order to be able to limit the switch-on current. The switch-on resistors are then disconnected in running operation. As an alternative, these switch-on resistors can be connected in series with a controllable switch-on element. The switch-on resistors are then bypassed for running operation. Since the switch-on resistor requires an additional controllable switching element, this is associated with costs.

SUMMARY

At least one embodiment of the invention specifies a method and/or a device for connecting a capacitive load assembly to a DC grid that are improved in terms of function and/or structure.

Embodiments are directed to a method, a computer program product and a device. Advantageous configurations result from the claims.

According to a first embodiment, a method for connecting a capacitive load assembly to a DC grid is proposed. A capacitive load assembly is understood as a load assembly that comprises one or more capacitive consumers. By way of example, such capacitive consumers are inverters, which generate an AC voltage for a consumer, for example a motor, from the DC voltage provided by the DC grid. Inverters of this kind generally have one or more capacitances for the operation thereof.

According to a second embodiment, the invention proposes a computer program product, which can be loaded directly into the internal memory of a digital control unit and comprises software code sections, using which the steps of an embodiment of the method described herein are executed when the product is run on the control unit. The computer program product can be embodied in the form of a storage medium, such as a USB memory stick, a DVD, a CD-ROM or a memory card, for example. The computer program product can also be present in the form of a signal that can be loaded via a wireless or wired communication link.

According to a third embodiment of the present invention, a device for connecting a capacitive load assembly to a DC grid is proposed. The device comprises a control unit, a controllable switching element, which can be switched on and off by the control unit, and a current measurement device, which is designed to detect the level of the current flowing through the controllable switching element. The control unit is designed to periodically switch the controllable switching element on and off by way of a control signal. The control unit is further designed, during a respective switch-on phase of the controllable switching element, to receive from the current measurement device a piece of current level information representing the level of the current pulses flowing through the controllable switching element. The control unit is furthermore designed to evaluate the development of the current level information of at least two successive current pulses over time and additionally to periodically switch the controllable switching element on and off when a predetermined change in the development of the current level of the at least two successive current pulses over time is ascertained.

BRIEF DESCRIPTION OF THE DRAWINGS

The invention is explained in more detail below with reference to an example embodiment in the drawing. In the figures:

FIG. 2 shows an electrical equivalent circuit diagram of the DC grid at the point of switch-on;

FIG. 3 shows various current and voltage profiles for various switch-on cases F1 to F4; and FIG. 4 shows a flowchart that illustrates the steps of the method according to an embodiment of the invention.

DETAILED DESCRIPTION OF THE EXAMPLE EMBODIMENTS

Figure 1:
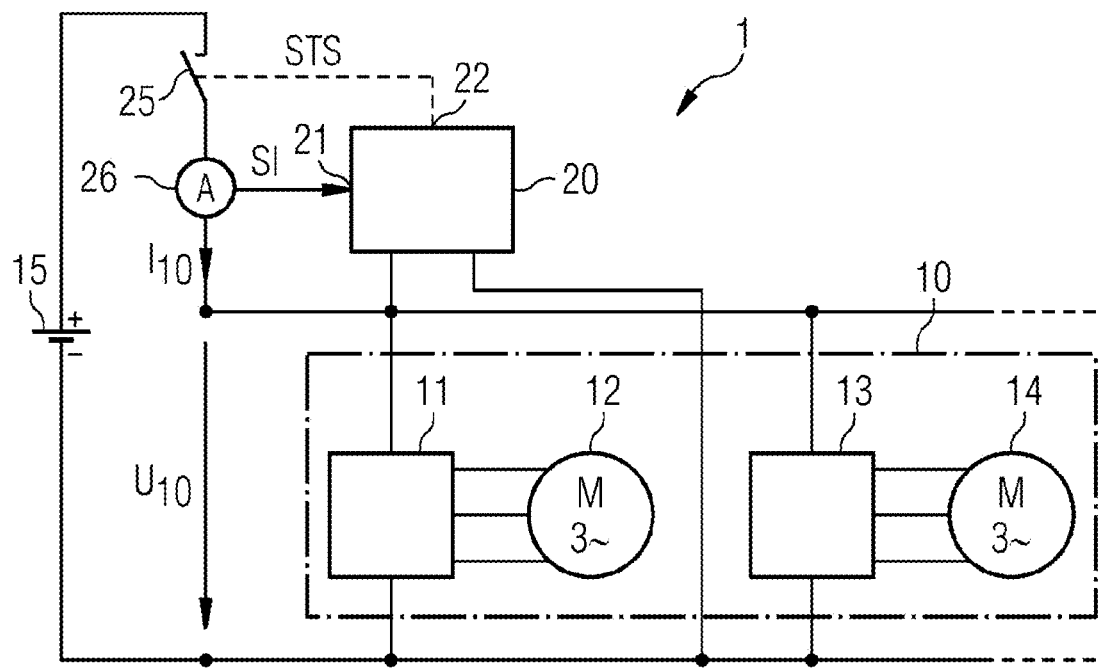
FIG. 1 shows a schematic illustration of an example DC grid, to which a capacitive load assembly can be connected via a controllable switching element.

According to a first embodiment, a method for connecting a capacitive load assembly to a DC grid is proposed. A capacitive load assembly is understood as a load assembly that comprises one or more capacitive consumers. By way of example, such capacitive consumers are inverters, which generate an AC voltage for a consumer, for example a motor, from the DC voltage provided by the DC grid. Inverters of this kind generally have one or more capacitances for the operation thereof.

The load assembly can be connected to a supply potential of the DC grid by a control unit via a controllable switching element. To this end, an embodiment of the control unit has a computation unit and a memory, in which programs and/or parameters and/or characteristic curves required to carry out the method according to an embodiment of the invention are stored. The memory can also be used to buffer-store information arising during the operation of the control unit.

Considered as controllable switching elements are, in particular, power electronics components. By way of example, these may be FETs (field-effect transistors) or IGBTs (insulated-gate bipolar transistors). In this case, a controllable switching element can comprise one or more power electronics components. These may be of the n-channel type or of the p-channel type or npn or pnp type.

Within the context of an embodiment of the method, the controllable switching element is periodically switched on and off by the control unit. For this purpose, the control unit generates a corresponding drive signal in order to switch the controllable switching element on and off repeatedly in alternation. The level of the current pulses flowing through the controllable switching element during a respective switch-on phase of the controllable switching element is detected via a current measurement device. The development of the level of at least two immediately (temporally) successive current pulses over time is subsequently evaluated by the control unit. When a predetermined change in the development of the level of the at least two successive current pulses over time is ascertained, the controllable switching element is additionally periodically switched on and off by the control unit.

A periodic and monitored switch-on and switch-off of the controllable switching element is carried out by way of an embodiment of the method according to an embodiment of the invention using a combination of the controllable switching element and a current measurement device, as a result of which a charging ramp for the capacitive elements of the load assembly can be realized. Since it is not yet possible during the first switch-on and the evaluation of the level of the first current pulse to determine whether, due to the level of the current pulse, a connection to a short circuit or the connecting of a large capacitive consumer of the load assembly to the DC grid is involved, the evaluation of a plurality of (temporally) successive current pulses makes it possible to determine how the current pulses change over time, depending on the state of charge of the capacitive load assembly. As a result thereof, it is possible to achieve a stepped increase in the voltage of the capacitive load assembly or the capacitive consumer of the capacitive load assembly.

As a result, it is possible to activate the DC grid with its load assembly via the current measurement device that is present anyway for the purpose of current monitoring. A protection system for the event of a short circuit and a switching member for switching the load assembly on and off can be realized by the combination of the controllable switching element and current measurement device. This combination can be provided as a modular unit, where appropriate. A further advantage is that power losses can be prevented via the switch-on resistor, which is now no longer required.

Since digital signal processing of the level of the current pulses is carried out by the control unit, which is simultaneously responsible for driving the controllable switching element, the DC grid can be switched on in normal operation conditions and protected at the same time. In addition, measurement values can be provided to a superordinate control system by the control unit during regular operation.

According to an expedient configuration of an embodiment, the controllable switching element is periodically switched on and off by the control unit until the level of a current pulse undershoots a prescribed current value. This configuration relates to the case in which the predetermined change in the development of the current level of the at least two successive current pulses over time is or has been determined. This process results due to the fact that with each current pulse the capacitive consumer of the load assembly is charged further, such that the voltage dropped across the capacitive consumer increases. As a result thereof, if there are no faults in the DC grid, the current flowing via the current measurement device becomes smaller with each further current pulse until it undershoots the prescribed current value. Undershooting the current value signals that the capacitive consumer of the load assembly is sufficiently or completely charged. The controllable switching element is then permanently switched on by the control unit after the prescribed current value has been reached. A current pulse that puts a load on the network no longer arises.

It is also expedient in an embodiment, when the controllable switching element is switched off by the control unit when the predetermined change in the development of the level of the at least two immediately successive current pulses over time is not ascertained. In particular, the controllable switching element is switched off by the control unit when an identical or a virtually identical level of the current pulses is ascertained in the development of the level of the at least two immediately successive current pulses over time. If the current pulses do not change (that is to say the predetermined change is not present), a short circuit is assumed. In this case, the controllable switching element is switched off by the control unit.

A further embodiment of an expedient configuration makes provision for the voltage dropped across the load assembly to additionally be detected via a voltage measurement device and for the development of the voltage over time during the at least two successive current pulses to be evaluated by the control unit. According to this configuration, the evaluation of the current pulses and of the voltage profile on the consumer side is used to determine how the current pulses change depending on the state of charge of the load assembly. If the current pulses do not change, that is to say the predetermined change is not achieved, and the voltage ascertained by the consumer does not increase, a short circuit is assumed. If the current pulses become smaller and if at the same time the voltage measured by the consumer becomes higher (that is to say the predetermined change is achieved), it is assumed that the capacitive consumer of the load assembly is charged.

A further configuration of an embodiment makes provision for the duration of the current pulses to be varied by the control unit. In particular, provision is made for the duration of the current pulses to be extended in chronological order. Depending on the current intensity and the capacitance that is to be switched, according to this configuration, the pulse duration of the charging pulse is extended, as a result of which the profile of the charging ramp can be influenced as desired.

According to a second embodiment, the invention proposes a computer program product, which can be loaded directly into the internal memory of a digital control unit and comprises software code sections, using which the steps of an embodiment of the method described herein are executed when the product is run on the control unit. The computer program product can be embodied in the form of a storage medium, such as a USB memory stick, a DVD, a CD-ROM or a memory card, for example. The computer program product can also be present in the form of a signal that can be loaded via a wireless or wired communication link.

According to a third embodiment of the present invention, a device for connecting a capacitive load assembly to a DC grid is proposed. The device comprises a control unit, a controllable switching element, which can be switched on and off by the control unit, and a current measurement device, which is designed to detect the level of the current flowing through the controllable switching element. The control unit is designed to periodically switch the controllable switching element on and off by way of a control signal. The control unit is further designed, during a respective switch-on phase of the controllable switching element, to receive from the current measurement device a piece of current level information representing the level of the current pulses flowing through the controllable switching element. The control unit is furthermore designed to evaluate the development of the current level information of at least two successive current pulses over time and additionally to periodically switch the controllable switching element on and off when a predetermined change in the development of the current level of the at least two successive current pulses over time is ascertained.

The device according to an embodiment of the invention has the same advantages as have been described above in connection with the method according to an embodiment of the invention.

In expedient configurations, an embodiment of the device is furthermore designed to carry out the steps of an embodiment of the method described herein.

FIG. 1 shows a schematic illustration of a DC grid 1, to which a capacitive load assembly 10 can be connected. The DC grid 1 provides a DC voltage at terminals or supply lines. In the schematic illustration, the DC voltage is provided by way of example by a battery 15. It is understood that the battery 15 is purely representative of an arbitrary energy source or a combination of several energy sources at the terminals of which a DC voltage is provided. Energy sources may be, for example, a photovoltaics installation and/or a battery store, but also a rectifier, which generates the DC voltage by rectifying an AC voltage generated by an AC voltage source.

The capacitive load assembly 10 (subsequently referred to only as load assembly 10) may comprise an arbitrary number of identical and/or different consumers. However, at least one of the consumers is capacitive in nature. In the example embodiment described here, the load arrangement 10 comprises purely by way of example two inverters 11, 13 to which respective three-phase motors 12, 14 are connected. The inverters 11, 13 in a known way convert the DC voltage provided by the DC grid to a three-phase or AC voltage required by the motors 12, 14. For this purpose, the inverters 11, 13 have a number of controllable switching elements (not illustrated) and at least one capacitor (not illustrated) and represent the capacitive consumers of the load assembly.

The load assembly 10 can be connected to a supply potential of the DC grid 1 via a controllable switching element 25. For this purpose, the controllable switching element 25 can be switched on by a control unit 20 by way of a control signal STS emitted at an output 22, as a result of which one connection of the load assembly 10 is connected to the negative potential of the battery 15. The other connection of the load assembly 10 is connected in a known way to the positive potential of the battery 15, which represents a reference potential, for example.

The controllable switching element 25 is a power electronics component, for example a MOSFET, IGBT, etc. The component may be of n-channel or p-channel type or npn or pnp type. The semiconductor material may be based on silicon (Si) or gallium nitride (GaN) or similar. The controllable switching element can comprise one or more power electronics components of the mentioned kind; these may be present in particular as a parallel circuit or else may be interconnected in anti-series.

A current measurement device 26 is located in the current path of the controllable switching element 25 purely by way of example between the controllable switching element 25 and the load assembly 10. The current measurement device 26 is a rapid electronic current measurement device, which is able to sample the current flowing through the controllable switching element 25 in the microsecond range. By way of example, the current measurement device can be designed as a magnetoresistive sensor (what is known as an MR sensor). Such sensors are offered by the company Sensitec, for example. As an alternative, the current measurement device 26 can be a sensor that is based on the Hall principal. A high-integrated Hall sensor of this type is described in EP 2 619 595 B1, for example.

Although the controllable switching element 25 and the current measurement device 26 are illustrated as separate elements in the schematic illustration of FIG. 1, they may also be present as a modular unit for the purpose of carrying out the method according to an embodiment of the invention.

The current measurement device 26 detects the current I10 flowing through the controllable switching element 25, wherein a piece of current level information SI, which represents the level of the current flowing through the controllable switching element 25, is fed to the control unit 20 at an input 21 (connection for current level information). The control unit 20 is designed, inter alia, to process the current level information SI in a computation unit (not illustrated in more detail) in normal operating conditions and to output the already mentioned control signal STS for the switching element 25 at the control output 22 based on the result of the processing.

Figure 2:
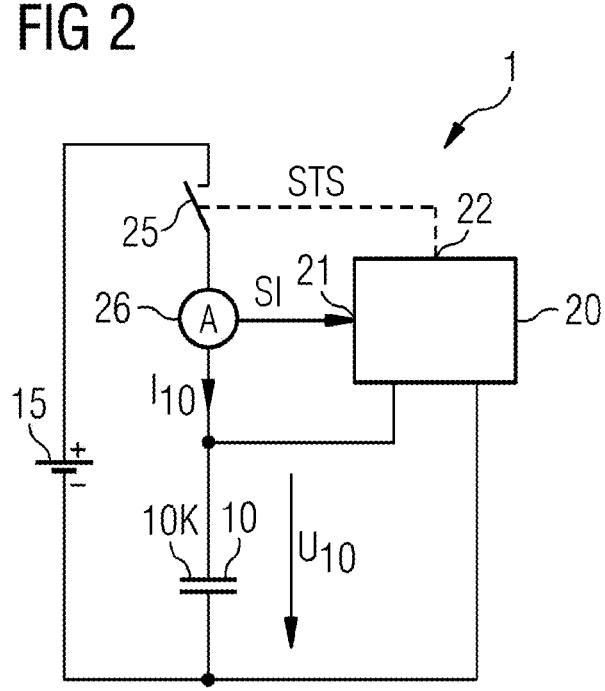

The simplified equivalent circuit diagram shown in FIG. 2 results at the point of switch-on on account of the capacitive consumers 11, 13 of the load assembly 10. In this simplified equivalent circuit diagram, the load assembly 10 is combined by way of a capacitor 10K, which represents the capacitances of the inverters 11, 13. During and after switch-on, the voltage U10, which in an optional configuration can additionally be detected and fed to the control unit 20 as a piece of information to be evaluated for the purpose of generating the control signal STS, drops across the capacitor 10K in this case.

In order to connect the load assembly 10 to the DC grid 1, the controllable switching element 25 is initially periodically switched on and off (step S1 in FIG. 4) by the control unit 20 by way of the control signal STS. The periodic switching of the controllable switching element 25 on and off in this case involves switching on the controllable switching element 25 at equidistant time intervals by way of the control signal STS emitted by the control unit 20. In this case, the periodic switching on and off is carried out in such a way that the controllable switching element 25 is switched on and off in a pulsed manner, that is to say the switch-on period of the switching element 25 is substantially shorter than the off period of the switching element 25.

During the (short) on phase of the switching element, the current measurement device 26 detects (step S2 in FIG. 4)

the current I10 flowing through the switching element. For each current pulse resulting from the switch-on, the piece of current level information SI representing the current level is transmitted to the control unit 20 for the purpose of evaluation. With the reception of the first piece of current level information SI, however, the control unit 20 cannot determine whether due to the flow of current I10 there is a connection to a short circuit or the capacitance 10K of the load assembly is charged.

Therefore, according to step S3 (FIG. 4), the development of the level of at least two immediately successive current pulses over time is evaluated by the control unit 20. By evaluating the current pulses di/dt and optionally the profile of the voltage U10 across the load assembly 10, the control unit 20 can be used to determine the way in which the current pulses change depending on the state of charge of the capacitance 10K.

If the level of the current pulses does not change, which makes itself noticed in a substantially identical or virtually identical (in terms of absolute value) piece of current information SI, a short circuit must be assumed. If the current pulses have a lower level, which makes itself noticed in accordingly reduced absolute values of the temporally successive pieces of current information SI, it can be assumed that the capacitance 10K of the load assembly 10 is charged.

If in step S4 (FIG. 4) it is determined, after a plurality of pieces of current level information have been evaluated, that a prescribed current value has been undershot, it is assumed that the capacitor 10K of the load assembly is fully charged. The control unit 20 then changes the control signal STS in such a way that the controllable switching element 25 is permanently turned on.

In contrast, if in step S4 it is determined, after a plurality of temporally successive pieces of current level information have been evaluated, that the piece of current level information SI is essentially identical or virtually identical, a short circuit is inferred. The control unit 20 then changes the control signal STS in such a way that the controllable switching element is permanently turned off.

As mentioned, the voltage U10 dropped across the load assembly can additionally be detected via the voltage measurement device, which is not illustrated in the figures, and the development of the voltage (that is to say the voltage profile) during the plurality of the detected current pulses can additionally be evaluated by the control unit 20.

Depending on the current intensity and the capacitance that is to be switched, the pulse duration of the individual charging pulses can furthermore be varied, in particular extended, in order to obtain a particular voltage ramp for charging the capacitor 10K of the load assembly 10. Corresponding control information can be determined in advance by way of tests and can be stored in the form of a characteristic curve or other control information in the control unit 20.

FIG. 3 shows the switch-on cases that have just been described with the driving of the controllable switching element 25 by the control unit 20 and the temporal current and voltage profiles resulting therefrom. In FIG. 3, current and voltage profiles arranged next to one another are associated with one another.

The first switch-on case F1 illustrates a situation in which the controllable switching element 25 is switched on without applying the method according to the invention. The controllable switching element 25 is switched on at a time t1, which results in a current peak. On the right-hand side, the voltage U10 building across the load assembly from the time t1 can be identified, wherein the capacitor 10K is charged at the time t2 so that the voltage no longer (significantly) increases and the current decays to virtually 0.

In the second switch-on case F2, the controllable switching element 25 is switched on and off in a pulsed manner by the control unit 20. In this case, three current pulses are illustrated, which have approximately the same level and thereby result in an approximately identical piece of current level information. As described above, the evaluation that the level of the current pulses does not change or does not change significantly permits the conclusion that there is a short circuit. Even after purely by way of example three current pulses, the controllable switching element 25 is therefore no longer switched on by the control unit 20. No voltage or no significant voltage builds up across the capacitor 10K of the load assembly 10.

In the third switch-on case F3, the controllable switching element 25 is periodically switched on and off by the control unit 20, wherein a current pulse arises with each switch-on. The current level of each temporally subsequent current pulse decreases, whereas at the same time the voltage U10 across the capacitor 10K of the load assembly 10 successively increases. By way of example, the seventh pulse undershoots a prescribed current value, which is stored in the control unit 20, wherein in this case it is assumed that the capacitor 10K of the load assembly 10 is fully charged. The controllable switching element 25 is now permanently turned on by the control unit 20, wherein there is no longer a significant change in the voltage U10.

The fourth switch-on case F4 shows a similar situation to this, wherein a stepped switch-on takes place, for example according to profiles stored in the control unit 20. In particular, the pulse duration of the charging pulses is varied, wherein the pulse duration is extended with each further pulse. As a result of this, the profile of the voltage U10 at the capacitor 10K of the load assembly (that is to say the charging ramp) can be influenced in a desired manner. With each extended current pulse, the level of the current flowing through the controllable switching element 25 becomes smaller at the same time.

The invention claimed is:

1. A method for connecting a capacitive load assembly to a DC grid, the load assembly being connectable to a supply potential of the DC grid by a controller via a controllable switching element, the method comprising:
   periodically switching, via the controller, the controllable switching element on and off;
   detecting, via a current measurement device, a level of current pulses flowing through the controllable switching element during a respective switch-on phase of the controllable switching element;
   evaluating, via the controller, development of the level of at least two immediately successive current pulses over time; and
   additionally periodically switching the controllable switching element on and off, via the controller, in response to a difference of the level of the at least two immediately successive current pulses exceeding a threshold.

2. The method of claim 1, wherein the periodically switching the controllable switching element on and off includes periodically switching the controllable switching element on and off via the controller until the level of a current pulse undershoots a threshold current value.

3. The method of claim 2, further comprising:
   turning the controllable switching element on via the controller, in response to the difference of the level of the at least two immediately successive current pulses not exceeding the threshold.

4. The method of claim 1, further comprising:
turning off the controllable switching element via the controller, upon the development of the level of the at least two immediately successive current pulses over time not being ascertained.

5. The method of claim 4, further comprising:
turning off the controllable switching element via the controller, upon an identical or a virtually identical level of the current pulses being ascertained in the development of the level of the at least two immediately successive current pulses over time.

6. The method of claim 1, further comprising:
detecting a voltage dropped across the load assembly via a voltage measurement device; and
evaluating, by the controller, a development of the voltage over time during the at least two successive current pulses.

7. The method of claim 1, further comprising:
varying, by the controller, a duration of the current pulses.

8. The method of claim 7, wherein the varying includes extending the duration of the current pulses in chronological order.

9. A non-transitory computer program product, storing a computer program directly loadable into the internal memory of a digital controller, the computer program including software code sections to execute the method of claim 1 when the product is run on the digital controller.

10. A device for connecting a capacitive load assembly to a DC grid, the device comprising:
a controller;
a controllable switching element, switchable on and off via the controller; and
a current measurement device, configured to detect a level of current flowing through the controllable switching element;
wherein the controller is configured to
periodically switch the controllable switching element on and off by way of a control signal;
receive from the current measurement device, during a respective switch-on phase of the controllable switching element, a piece of current level information representing a level of current pulses flowing through the controllable switching element;
evaluate development of the current level information of at least two successive current pulses over time; and
additionally periodically switch the controllable switching element on and off in response to a difference of the current level of the at least two successive current pulses exceeding a threshold.

11. The device of claim 10, wherein controller is further configured to:
periodically switch the controllable switching element on and off via the controller until the level of a current pulse undershoots a threshold current value.

12. The method of claim 2, further comprising:
turning off the controllable switching element via the controller, upon the development of the level of the at least two immediately successive current pulses over time not being ascertained.

13. The method of claim 12, further comprising:
turning off the controllable switching element via the controller, upon an identical or a virtually identical level of the current pulses being ascertained in the development of the level of the at least two immediately successive current pulses over time.

14. The method of claim 2, further comprising:
detecting a voltage dropped across the load assembly via a voltage measurement device; and
evaluating, by the controller, a development of the voltage over time during the at least two successive current pulses.

15. The method of claim 2, further comprising:
varying, by the controller, a duration of the current pulses.

16. The method of claim 15, wherein the varying includes extending the duration of the current pulses in chronological order.

17. A non-transitory computer program product, storing a computer program directly loadable into an internal memory of a digital controller, the computer program including software code sections to execute the method of claim 2 when the product is run on the digital controller.

18. The device of claim 10, controller is further configured to:
turn the controllable switching element off upon the development of the level of the at least two successive current pulses over time not being ascertained.

19. The device of claim 10, wherein the controller is further configured to turn the controllable switching element off upon an identical or a virtually identical level of the current pulses being ascertained in the development of the level of the at least two successive current pulses over time.

* * * * *